(12) United States Patent
Yang et al.

(10) Patent No.: US 12,711,650 B2
(45) Date of Patent: Aug. 18, 2026

(54) METHOD, ELECTRONIC DEVICE AND MEDIUM FOR TARGET STATE ESTIMATION

(71) Applicant: BEIJING TUSEN ZHITU TECHNOLOGY CO., LTD., Beijing (CN)

(72) Inventors: Yunchen Yang, Shanghai (CN); Weijun Liu, Beijing (CN); Jiaming Sun, Beijing (CN); Naiyan Wang, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 226 days.

(21) Appl. No.: 18/351,931

(22) Filed: Jul. 13, 2023

(65) Prior Publication Data

US 2024/0020870 A1 Jan. 18, 2024

(30) Foreign Application Priority Data

Jul. 15, 2022 (CN) ......................... 202210837617.3

(51) Int. Cl.
*G06V 20/54* (2022.01)
*G06T 7/20* (2017.01)
*G06T 7/70* (2017.01)

(52) U.S. Cl.
CPC .................. *G06T 7/70* (2017.01); *G06T 7/20* (2013.01); *G06V 20/54* (2022.01)

(58) Field of Classification Search
CPC .. G06T 7/70; G06T 7/20; G06V 20/54; G06V 10/62; G06V 20/58; G06V 2201/07
See application file for complete search history.

(56) References Cited

U.S. PATENT DOCUMENTS 12,221,115 B1 * 2/2025 Blaes .................. B60W 60/001
2018/0009445 A1 1/2018 Nishi
(Continued)

FOREIGN PATENT DOCUMENTS

CN 108717712 10/2018
CN 108732603 11/2018
(Continued)

OTHER PUBLICATIONS

Butt et al., "Multiple Target Tracking Using Frame Triplets," Computer Vision ACCV 2012, Springer Berlin Heidelberg, Berlin, Heidelberg, Nov. 5, 2012, pp. 163-176.
(Continued)

*Primary Examiner* — Syed Haider
(74) *Attorney, Agent, or Firm* — Fish & Richardson P.C.

(57) ABSTRACT

The present disclosure relates to a method for target state estimation comprising: acquiring a data frame sequence corresponding to a plurality of moments; determining a first time window based on the data frame sequence, the first time window comprising a first set of state variables to be optimized; determining a plurality of second time windows within the first time window, wherein the number of data frames in each second time window is less than the number of data frames in the first time window, there is a repeated data frame in two adjacent second time windows, and there is a second set of state variables to be optimized; and optimizing the second set of state variables in the plurality of second time windows to obtain an optimized first set of state variables. The method of the present disclosure may obtain sufficiently accurate state estimation.

17 Claims, 3 Drawing Sheets

(56) References Cited

U.S. PATENT DOCUMENTS

| | | | | |
|---|---|---|---|---|
| 2020/0125094 | A1 | 4/2020 | Zhang et al. | |
| 2020/0409385 | A1 * | 12/2020 | Chakravarty | G06V 20/56 |
| 2021/0350146 | A1 * | 11/2021 | Zhang | G06V 20/56 |
| 2022/0410933 | A1 | 12/2022 | Silva et al. | |
| 2023/0185304 | A1 | 6/2023 | Wuthishuwong et al. | |
| 2023/0314548 | A1 * | 10/2023 | Xie | G01S 5/0264 701/445 |
| 2023/0324859 | A1 | 10/2023 | Quirynen et al. | |
| 2024/0025428 | A1 | 1/2024 | Yang et al. | |
| 2024/0219557 | A1 | 7/2024 | Hassibi et al. | |

FOREIGN PATENT DOCUMENTS

| | | |
|---|---|---|
| CN | 109631894 | 4/2019 |
| CN | 110296702 | 10/2019 |
| CN | 111144542 A | 5/2020 |
| CN | 111931905 | 11/2020 |
| CN | 112733907 | 4/2021 |
| CN | 112989978 | 6/2021 |
| CN | 113076599 | 7/2021 |
| CN | 113819905 | 12/2021 |
| CN | 113945206 | 1/2022 |
| CN | 114660661 A | 6/2022 |
| WO | WO 2022/045982 A1 | 3/2022 |

OTHER PUBLICATIONS

Extended European Search Report in European Appln. No. 23184287.3, dated Nov. 20, 2023, 7 pages.

Tang et al., "Single-Camera and Inter-Camera Vehicle Tracking and 3D Speed Estimation Based on Fusion of Visual and Semantic Features," 2018 IEEE/CVF Conference on Computer Vision and Pattern Recognition Workshops (CVPRW), IEEE, Jun. 18, 2018, pp. 108-115.

Extended European Search Report in European Appln. No. 23184310.3, mailed on May 2, 2024, 14 pages.

Partial European Search Report in European Appln. No. 23184310.3, mailed on Feb. 6, 2024, 17 pages.

Payne et al., "Control of a robot-trailer system using a single non-collocated sensor," Paper, Presented at IECON 2012—38th Annual Conference on IEEE Industrial Electronics Society, IEEE, Montreal, Canada, Oct. 25-28, 2012, pp. 2674-2679.

Office Action in Chinese Appln. No. 202210837617.3, mailed on Mar. 20, 2026, 16 pages (with English Translation).

* cited by examiner

METHOD, ELECTRONIC DEVICE AND MEDIUM FOR TARGET STATE ESTIMATION

CROSS-REFERENCE TO RELATED APPLICATION

The present disclosure claims priority to Chinese Patent Application No. 202210837617.3, titled "METHOD, APPARATUS, ELECTRONIC DEVICE AND MEDIUM FOR TARGET STATE ESTIMATION", filed on Jul. 15, 2022, the content of which is incorporated herein by reference in its entirety.

TECHNICAL FIELD

The present disclosure relates to the field of computers, in particular to the field of autonomous driving and data processing techniques, and more particularly to a method, apparatus, electronic device, computer-readable storage medium and computer program product for target state estimation.

BACKGROUND

In identifying or observing a target, it is often necessary to accurately estimate the state of a target based on target measurement data obtained by a sensor. The position of the target has a strong correlation with the change of velocity, angle, acceleration, and other parameters. For example, an important part of autonomous driving is the real-time estimation of the position, velocity, size, and orientation of other vehicles on the road, which largely determines the safety factor of autonomous driving. Therefore, in order to improve the performance of target recognition or observation variable, it is urgently needed to study more superior state estimating methods.

The methods described in this section are not necessarily those that have been previously conceived or adopted. Unless otherwise indicated, it should not be assumed that any of the methods described in this section are considered prior art merely by virtue of their inclusion in this section. Similarly, the problems mentioned in this section should not be considered to have been acknowledged in any prior art unless otherwise indicated.

SUMMARY

According to an aspect of the present disclosure, provided is a method for target state estimation including: acquiring a data frame sequence corresponding to a plurality of moments; determining a first time window based on the data frame sequence, the first time window comprising a first set of state variables to be optimized; determining a plurality of second time windows within the first time window, wherein the number of data frames corresponding to each second time window is less than the number of data frames corresponding to the first time window, there is a repeated data frame in two adjacent second time windows, and there is a second set of state variables to be optimized in each second time window; and optimizing the second set of state variables in the plurality of second time windows to obtain an optimized first set of state variables.

According to another aspect of the present disclosure, provided is an apparatus for target state estimation including: an acquisition unit configured to acquire a data frame sequence corresponding to a plurality of moments; a determination unit configured to determine a first time window based on the data frame sequence, the first time window comprising a first set of state variables to be optimized; a selection unit configured to determine a plurality of second time windows within the first time window, wherein the number of data frames in each second time window is less than the number of data frames in the first time window, there is a repeated data frame in two adjacent second time windows, and there is s a second set of state variables to be optimized in each second time windows; an optimization unit configured to optimize the second set of state variables in the plurality of second time windows to obtain an optimized first set of state variables.

According to another aspect of the present disclosure, provided is an electronic device including: at least one processor; and

- a memory communicatively connected to the at least one processor; wherein the memory stores an instruction executable by the at least one processor, and the instruction is executed by the at least one processor to enable the at least one processor to execute the method of the present disclosure.

According to another aspect of the present disclosure, provided is a non-transitory computer-readable storage medium storing computer instructions for causing a computer to perform the method of the present disclosure.

According to one or more embodiments of the present disclosure, when optimizing the state variable within the first time window, the global smoothness of the state variable within the first time window is maintained by providing a plurality of second time windows and by optimizing the state variable within the second time window, thereby improving the accuracy of the target state estimating.

It is to be understood that the description in this section is not intended to identify key or critical features of the embodiments of the present invention, nor is it intended to limit the scope of the invention. Other features of the invention will become readily apparent from the following description.

BRIEF DESCRIPTION OF THE DRAWINGS

The accompanying drawings, which are incorporated in and constitute a part of this description, illustrate embodiments and, together with the description, serve to explain exemplary implementations of the embodiments. The illustrated embodiments are for illustrative purposes only and do not limit the scope of the claims. Throughout the drawings, the same reference numerals indicate similar, but not necessarily identical elements.

DETAILED DESCRIPTION

Figure 1:
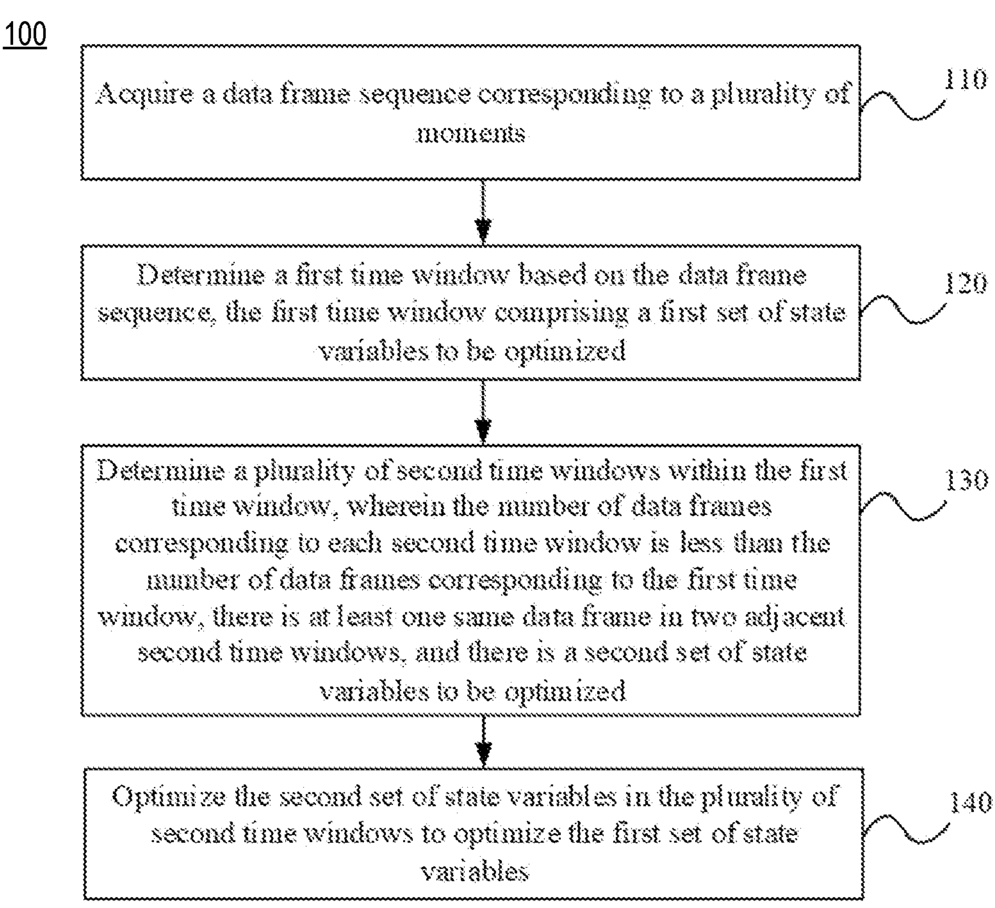
FIG. 1 is a flowchart illustrating a target state estimating method according to an exemplary embodiment.

Exemplary embodiments of the invention are described below in connection with the accompanying drawings, in which various details of the disclosed embodiments are included to facilitate understanding and are to be considered exemplary only. Accordingly, a person skilled in the art in the art will recognize that various changes and modifications may be made to the embodiments described herein without departing from the scope of the present disclosure. Also, descriptions of well-known functions and structures are omitted from the following description for clarity and conciseness.

In the present disclosure, the use of the terms "first", "second", etc. to describe various elements is not intended to limit the positional, temporal, or importance relationships of the elements unless otherwise indicated, and such terms are used solely to distinguish one element from another. In some examples, a first element and a second element may refer to the same instance of the element, and in some cases, they may refer to different instances based on the context.

The terminology used in the description of the various illustrated examples in the present disclosure is for the purpose of describing particular examples only and is not intended to be limiting. Unless the context clearly indicates otherwise, if the number of an element is not expressly limited, the element may be one or more. Furthermore, the item "and/or" as used in the present disclosure encompasses all possible combinations of the listed items.

An important part of autonomous driving is the real-time estimation of the position, velocity, size and orientation of other vehicles on the road, which largely determines the safety factor of autonomous driving. The velocity, position and other information of the vehicle can be observed through a corresponding observation model, and the data observed by the observation model usually exert an impact of noise or the like, so that the observed data has an error with the actual driving data of the vehicle. It is therefore necessary to correct this observation variable data, i.e., to estimate the physical state of the vehicle during its travel from the observation variable data.

Generally, in a state estimation process, a certain state is estimated based on corresponding observation variable data, for example, a vehicle velocity state is estimated based on observed velocity information, a vehicle position state is estimated based on observed coordinates of a vehicle center point, etc. Generally, in estimating the physical state of a vehicle, optimization of a set of state variables within the time window may be achieved by constructing a time window, such as a sliding time window. It can be seen that the optimization effect of a set of state variables within a time window becomes the key to influencing the safety factor of the unmanned.

Accordingly, embodiments of the present disclosure provide a method for target state estimation including: acquiring a data frame sequence corresponding to a plurality of moments; determining a first time window based on the data frame sequence, the first time window comprising a first set of state variables to be optimized; determining a plurality of second time windows within the first time window, wherein the number of data frames in each second time window is less than the number of data frames in the first time window, there is a repeated data frame in two adjacent second time windows, and there is a second set of state variables to be optimized in each second time window; and jointly optimizing a second set of state variables in a plurality of second time windows to obtain an optimized first set of state variables.

According to embodiments of the present disclosure, when optimizing the state variable within the first time window, the global smoothness of the state variable within the first time window is maintained by providing a plurality of second time windows and by simultaneously optimizing the state variable within the second time window, thereby improving the accuracy and robustness of the target state estimating.

FIG. 1 shows a flowchart of a method for target state estimation according to an embodiment of the present disclosure. As shown in FIG. 1, in step 110, a data frame sequence corresponding to a plurality of moments is acquired.

According to an embodiment of the present disclosure, the target may include a vehicle. Thus, the data frame sequence may correspond to observations at multiple times of the target vehicle. Illustratively, the observations may include: at least one of a velocity, a position, and an orientation of the target vehicle at each moment; and a size of the target vehicle which may include at least one of a length, a width, and a height.

In some embodiments, the observations corresponding to the data frame sequence may be obtained based on a variety of sensors. Illustratively, the plurality of sensors may include at least one of: an image acquisition apparatus and a point cloud acquisition apparatus. Illustratively, the image acquisition device may include a wide variety of devices, such as a vision camera, an infrared camera, a camera that performs ultraviolet or X-ray imaging, etc. Different devices may provide different detection accuracies and ranges. The vision camera may capture information such as the running state of the target in real time. Infrared cameras may capture targets at night. Ultraviolet or X-ray imaging cameras may image targets in various complex environments (nighttime, inclement weather, electromagnetic interference, etc.). The point cloud acquisition apparatus may also include a wide variety of devices such as LiDAR, millimeter wave radar, ultrasonic sensors, etc. Different devices may provide different detection accuracies and ranges. Lidar may be used to detect the edge and shape information of a target to perform target identification and tracking. Millimeter-wave radar may be used to measure a distance to a target using characteristics of an electromagnetic wave. The ultrasonic sensor may be used to measure the distance to the target by using the characteristics of strong ultrasonic directivity. Due to the Doppler effect, the radar apparatus may also measure velocity changes with moving targets.

According to some embodiments, the plurality of sensors may be located on at least one observation vehicle or roadside device. By way of example, while an autonomously driven vehicle is traveling, various sensors may be mounted in front of, behind, or other locations on the vehicle to enable real-time observation variable of surrounding vehicles. Alternatively, a variety of sensors are located on the roadside device to make real-time observation variable of targets such as vehicles and pedestrians traveling through the roadside device.

In some examples, the roadside equipment may include electronic device, communication equipment, etc. and the h may be integrated with the communication equipment or provided separately. The electronic device may acquire the data observed by the various sensors, perform data processing and calculations to obtain corresponding observation variables, and transmit the processed and calculated results to the computing device via the communication device. Alternatively, the electronic device may be disposed at the cloud to acquire data observed by various sensors on the roadside device through the communication device and to obtain corresponding observation variables through data analysis and calculation.

According to some embodiments, a target state estimating method according to the present disclosure may be implemented in a computing device that obtains at least one observation variable through each sensor. That is, the observation variables of the targets acquired by various sensors at various moments may be analyzed online or offline by a computing device. The computing device may reside on at least one observation vehicle, on a roadside device, or on a cloud, without limitation.

According to some embodiments, the observation variables may be derived from an observation model for each sensor. Illustratively, the observation model includes at least one of: an image-based binocular ranging algorithm, an image-based monocular ranging algorithm, a point cloud-based ranging algorithm, an image-map-based projection ranging algorithm, and a point cloud-map-based projection ranging algorithm.

In the present disclosure, the observation model may perform analysis and calculation based on data acquired by the sensor to output an observation variable at each moment corresponding to the target. Specifically, in some examples, a center point coordinate of a surrounding vehicle and four angular point coordinates of a detection box, etc. may be obtained based on a projection ranging algorithm; the coordinates of the center points of the surrounding vehicles, the velocities, etc. may be obtained by a distance measurement algorithm based on a binocular distance measurement algorithm, a monocular distance measurement algorithm, etc.

In some embodiments, data pre-processing may be performed on the acquired observation variables after the acquisition of the observation variables of the target at various moments by the various sensors. By way of example, abnormal observation variables may be deleted, available observation variables are retained, data formats are unified, etc., without being limited thereto.

In step 120, a first time window is determined in the data frame sequence, the first time window comprising a first set of state variables to be optimized.

During driving, the vehicle can, for example, make real-time observation variables of surrounding vehicles via a plurality of sensors, so that the observation variable data, i.e., data frame sequence are continuously generated. Based on the observed data, a to-be-optimized state variable can be determined. In some embodiments, optimization of the physical state of the vehicle may be achieved by constructing a time window.

Specifically, an observation variable for the target vehicle observed by at least one observation model within a first time window is acquired to construct a state variable describing a physical state of the target vehicle within the first time window based on the observation variable. In some examples, the first time window may be a sliding time window, the length of the first time window and the sliding step size may be arbitrarily set, and of course the first time window may not slide, without limitation.

According to some embodiments, the first set of state variables corresponding to the first time window comprises at least one of: at least one of a velocity, a position, an orientation, and a size of the target at each moment in the first time window; the state variable such as the velocity, the position, and the orientation of the target at each moment point is an instantaneous state variable. Additionally, the first set of state variables may further comprise at least one of an average velocity, an average position, and an average orientation of the target within the first time window.

Figure 2:
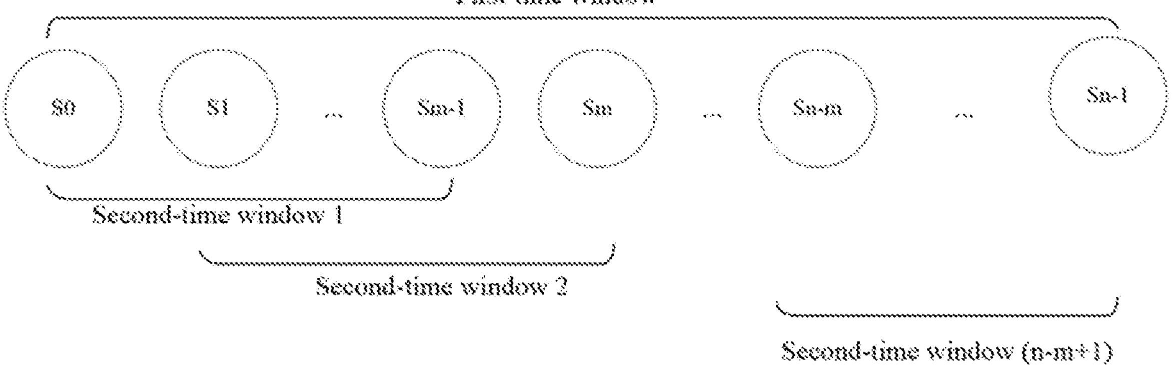
FIG. 2 is a schematic diagram illustrating a time window for target state estimating according to an exemplary embodiment.

FIG. 2 shows a schematic diagram of a time window for target state estimation according to an embodiment of the present disclosure. As shown in FIG. 2, the first time window comprises n to-be-optimized state variables, constituting a first set of state variables, i.e., $S_0, S_1, \ldots, S_{n-1}$. The first set of state variables may further comprise at least one of an average velocity, an average position, and an average orientation of the target within the first time window, without limitation.

Illustratively, the to-be-optimized state variable in the first time window may be constructed according to Formula (1).

$$S = \left[s_0, \ldots, s_{n-2}, s_{n-1}, \overline{v}_1^T, \ldots, \overline{v}_{n-m}^T, \overline{v}_{n-m+1}^T, \overline{o}_1, \ldots, \overline{o}_{n-m}, \overline{o}_{n-m+1}, L, W\right]^T \tag{1}$$

The $(i)^{th}$ frame state variable $s_i$ in the first time window may include, for example, the state variable shown in Formula (2).

$$s_i = \left[v_i^T, \theta_i, o_i\right] \tag{2}$$

$v_i$, $\theta_i$ and $o_i$ represent the velocity magnitude, the velocity direction, and the vehicle body orientation of the target vehicle. In addition, $\overline{v}_1^T, \ldots, v_{n-m}^T, v_{n-m+1}^T$ and $\overline{o}_1, \ldots, \overline{o}_{n-m}, \overline{o}_{n-m+1}$ will be illustrated in relation to step 130 described later.

According to some embodiments, the target is a vehicle, which includes a first component and at least one second component rotatable around the first component. Thus, in some examples, the location of the target may include at least one of: a position of the first member, a position of each of the second members, and a position of the vehicle; the dimensions of the target include at least one of: a size of the first member, a size of each of the second members, and a size of the vehicle. The orientation of the target comprises at least one of: an orientation of the velocity, an orientation of the first member, and an orientation of a lane in which the vehicle is located.

By way of example, in the embodiment where the target vehicle is a truck, the target vehicle may be a truck comprising two front and rear components, i.e., a first component of the truck being a tractor and a second component being a trailer, the pivot structure (or hinge) connected between the tractor and the trailer forming a structural constraint therebetween.

In some examples, when the target vehicle is a structure such as a truck, the velocity magnitude, velocity direction of the target vehicle may be the velocity magnitude and velocity direction of the tractor. Further, the vehicle body orientation is a tractor orientation, and the $(i)^{th}$ frame state variable $s_i$ may further include a trailer orientation $\beta_i$, $$\text{i.e., } s_i = \left[v_i^T, \theta_i, o_i, \beta_i\right].$$

It will be appreciated that the to-be-optimized state variables within the time windows shown in Formulas (1) and (2) are merely exemplary, without being limited thereto.

Figure 3:
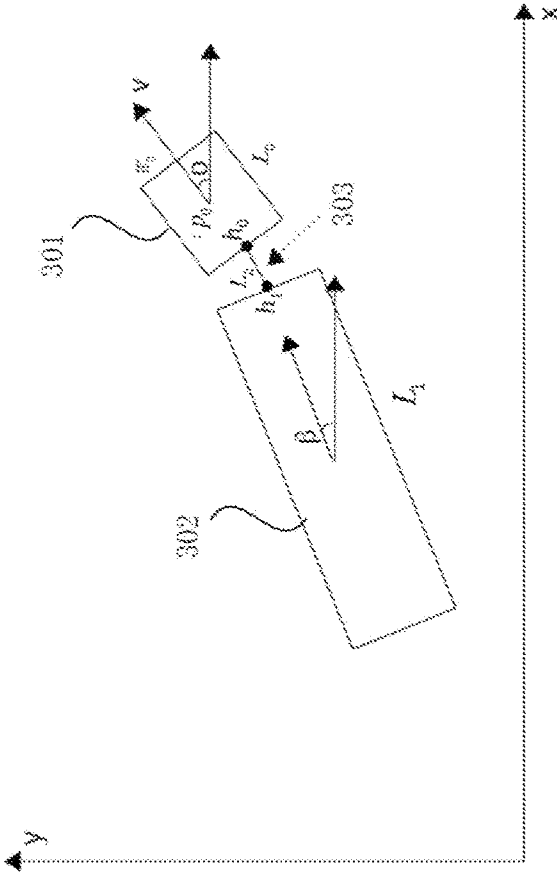
FIG. 3 is a schematic diagram illustrating a truck motion model according to an exemplary embodiment.

FIG. 3 shows a schematic diagram of a truck motion model according to an embodiment of the present disclosure. As shown in FIG. 3, a tractor 301 and a trailer 302 are connected by a pivot structure 303. In some embodiments, the tractor 301 may be processed based on a motion model of the vehicle containing only the first component, but the observation variable of the motion of the trailer imposes constraints on the observation variable of the motion of the tractor. The vehicle including only the first component may be, for example, a monocycle, an ordinary four-wheeled vehicle, or the like.

Figure 4:
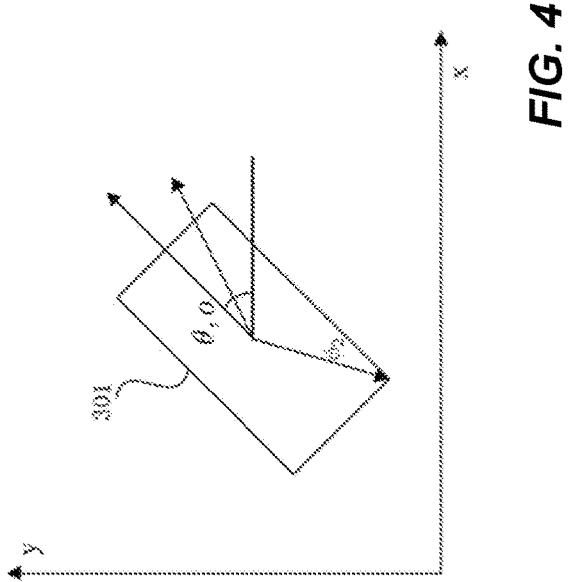
FIG. 4 is a schematic diagram illustrating a motion model of a vehicle including only a first component according to an exemplary embodiment.

FIG. 4 shows a schematic diagram of a vehicle motion model including only a first component according to an embodiment of the present disclosure. In some examples, the velocity direction of the vehicle is distinguished from the orientation direction to improve the accuracy of the vehicle state estimation. In the motion model shown in FIG. 4, o is the direction of the vehicle (i.e., the head direction), and $\theta$ is the velocity direction of the vehicle. Assuming that the vehicle has a velocity $v_i$ from moment $t_i$ to moment $t_{i+1}$, and there is a transformation Formula as shown in the following Formulas (3) and (4).

$$px_{i+1} = px_i + v_i \cdot \cos\theta_i \tag{3}$$

$$py_{i+1} = py_i + v_i \cdot \sin\theta_i \tag{4}$$

$px_i$ and $py_i$ respectively represent coordinates of a vehicle center point at moment $t_i$; $px_{i+1}$ and $py_{i+1}$ respectively represent coordinates of a vehicle center point at moment $t_{i+1}$; $\theta_i$ represents an angle between the vehicle velocity direction at the moment $t_i$ and the x-direction in the reference coordinate system.

In the present disclosure, the reference coordinate system is a coordinate system determined based on the observed vehicle or road measuring device in which the plurality of sensors is located. Illustratively, when a plurality of sensors is located on an observing vehicle, a reference coordinate system is used as a coordinate system describing the relationship of objects around the vehicle to the vehicle. According to different definitions, the origin thereof is also different, for example, the center of gravity may be taken as the origin, and the right-hand coordinate system extending therefrom is a reference coordinate system; or the reference coordinate system defined by Inertial Measurement Unit (IMU) takes the IMU position as the origin.

It will be appreciated that any suitable reference coordinate system is possible, for example the reference coordinate system may also have a transverse coordinate axis with the lane centerline, a longitudinal coordinate axis offset from the lane centerline, and a vertical coordinate axis perpendicular to the lane centerline, without limitation.

As described above, based on the projection ranging algorithm, four corner coordinates of the vehicle detection frame may be obtained, i.e., vehicle contour detection is achieved. Therefore, in the vehicle body frame as shown in FIG. 4, the vector of the vehicle center to the $(i)^{th}$ vehicle angular point may be expressed as shown in Formula (5).

$$\phi_i = R_{bw}\begin{bmatrix} \delta_i L \\ \eta_i W \end{bmatrix} \tag{5}$$

L and W are the length and width of the vehicle, respectively; $[\delta_i, \eta_i]$ represents the offset of the i vehicle angular point relative to the vehicle center point in the reference coordinate system, which is constant for each vehicle angular point; $R_{bw}$ represents a rotation matrix from a reference coordinate system to an East-North-Up (ENU) coordinate system, wherein $R_{bw}$ represents as shown in Formula (6).

$$R_{bw} = \begin{bmatrix} \cos o & -\sin o \\ \sin o & \cos o \end{bmatrix} \tag{6}$$

Thus, it is sufficient to determine a vehicle based on information such as velocity, orientation, size, and center point position of the vehicle.

With continued reference to FIG. 3, in some embodiments, the trailer 302 and the pivot structure 303 have generally the same orientation and thus may be handled as a rigid body structure. In addition, it may be assumed that the pivot structure 303 links the center position of the contact surfaces with the tractor 301 and trailer 302. Once the center point coordinates $p_0$, length $L_0$, and width $W_0$ of the tractor 301 are known, the center point coordinates $p_1$ of the trailer 302 are obtained, as shown in Formulas (7)-(9).

$$p_1 = p_0 + \text{offset}_0 - \text{offset}_1 \tag{7}$$

$$\text{offset}_0 = \begin{bmatrix} \cos o & -\sin o \\ \sin o & \cos o \end{bmatrix}\begin{bmatrix} -0.5L_0 \\ 0 \end{bmatrix} \tag{8}$$

$$\text{offset}_1 = \begin{bmatrix} \cos\beta & -\sin\beta \\ \sin\beta & \cos\beta \end{bmatrix}\begin{bmatrix} 0.5L_1 + L_h \\ 0 \end{bmatrix} \tag{9}$$

$L_1$ is the length of the trailer, $L_h$ is the length of the pivot structure, and o and $\beta$ are respectively an included angle of the tractor and trailer with respect to the x-axis direction of the reference coordinate system.

In some examples, the detection boxes of the tractor and trailer may be obtained simultaneously by a sensor such as a Lidar. The detection box of the trailer is moved from $h_1$ (when i is 1, the position of $h_i$ in FIG. 3) to $h_0$ (the position of $h_0$ in FIG. 3), assuming another observation variable of the tractor causes the observation variable of the trailer to constrain the observation variable of the tractor, as shown in Formula (10).

$$h_0 = h_1 + \begin{bmatrix} \cos\beta & -\sin\beta \\ \sin\beta & \cos\beta \end{bmatrix}\begin{bmatrix} L_h \\ 0 \end{bmatrix} \tag{10}$$

The angular velocity of the trailer may be as shown in Formula (11):

$$\dot{\beta} = \frac{v}{L_1 + L_h}\sin(o - \beta) \tag{11}$$

v represents the velocity of the tractor and $\dot{\beta}$ represents the angular velocity of the trailer. Various conditions of a truck may be determined from the velocity, orientation, size, pivot length of the tractor, position of the tractor.

As mentioned above, a model has been described in which the target vehicle includes a two-stage structure, i.e., the target vehicle includes a first component and a second component. In some embodiments, the second component may also be a plurality of components, such as trains, multi-trailer trucks, etc., whose motion models may be referenced to the truck models described above, and will not be described in detail herein.

In step 130 of FIG. 1, a plurality of second time windows is determined within the first time window, the number of data frames within the second time window is less than the number of data frames within the first time window, there is a repeated data frame in two adjacent second time windows, and there is a second set of state variables to be optimized in each second time window.

With continued reference to FIG. 2, a plurality of second time windows is included within the first time window, i.e. the second time window 1, the second time window 2, . . . , the second time window (n−m+1). Each second time window has a second set of to-be-optimized state variables. In FIG. 2, each second time window comprises m state variables, two adjacent second time windows have (m−1) repeated data frames. It will be appreciated that the number of data frames repeated between adjacent second time windows and the number of state variables in the second set of state variables is merely exemplary and is not limiting herein.

According to some embodiments, the second set of state variables comprises at least one of: at least one of a velocity, a position, an orientation, and a size of the target at each moment in the second time window; at least one of an average velocity, an average position, and an average orientation of the target within the second time window.

Referring to the aforementioned equation (1), $\bar{v}_1^T$ represents an average velocity in the first second time window, $\bar{v}_{n-m}^T$ represents an average velocity in the $(n-m)^{th}$ second time window, and $\bar{v}_{n-m+1}^T$ represents an average velocity in the $(n-m+1)^{th}$ second time window. $\bar{o}_1$ represents an average orientation in the first second time window, $\bar{o}_{n-m}$ represents an average orientation in the $(n-m)^{th}$ second time window and $\bar{o}_{n-m+1}$ represents an average orientation in the $(n-m+1)^{th}$ second time window.

In step 140 of FIG. 1, the second set of state variables in the plurality of second time windows is simultaneously optimized to obtain an optimized first set of state variables.

According to some embodiments, the optimization is achieved by minimizing a loss function. The loss function is determined based on the state variable of the target and the observation variable of the target at each moment in the plurality of second time windows; the observation variable is observed by at least one observation model, which is based on at least one sensor.

In particular, in some embodiments, the loss function includes at least one of a position loss, an orientation loss, a velocity loss, a size loss, and a structural constraint of the target. Optimization of the state variable at each moment of the target is achieved by minimizing the loss function. Illustratively, where the loss function includes position loss, orientation loss, velocity loss, size loss, the loss function may be constructed based on Formula (12).

$$E = E_p + E_v + E_o + E_s \tag{12}$$

$E_p$, $E_v$, $E_o$ and $E_s$ represent position loss, orientation loss, velocity loss and size loss, respectively. The loss function is determined based on the to-be-optimized state variable. Specifically, each of the position loss, orientation loss, velocity loss, and size loss may be determined based on the to-be-optimized state variable, the observation variable corresponding to the state variable, and other observation variables that may provide constraints on the state variable.

In an exemplary scenario according to the present disclosure, the velocity observation variable of the target vehicle, the position of the target vehicle, etc. may provide constraints on the velocity magnitude and velocity direction of the target vehicle; in addition, the velocity prior and the average velocity of the target vehicle may also provide constraints on the velocity magnitude and the velocity direction of the target vehicle; a lane line direction, a velocity direction, a target vehicle orientation observed by a Lidar sensor, an orientation prior of the target vehicle, an average orientation, etc. may provide a constraint condition on a vehicle body orientation of the target vehicle, etc. This will be described in detail below.

In the present disclosure, the transition from single-sensor identification to multi-sensor fusion is achieved by multiple sensors acquiring observation variable of a target at various moments and constructing corresponding loss functions. Thus, during the running of the vehicle, the surrounding vehicles may be modeled in combination with the sensing results of various sensors, and the state information of the surrounding vehicles may be updated in real time, so that the unmanned system may make safe path planning based on the results, thereby avoiding traffic accidents.

In some embodiments, the loss function comprises a smoothing loss of the state variable determined based on a plurality of second time windows; the smoothing loss is calculated from a state variable of the target at each moment in each second time window and an average value of the state variable of the target in each second time window.

The smoothing loss of the state variables determined based on the plurality of second time windows makes full use of the data of the present moment and each moment before and after the present moment when estimating the state of the present moment, so that the state variable obtained after optimizing the first time window is smoother, and the accuracy of the target state estimating is improved.

In particular, according to some embodiments, the loss function comprises a velocity loss associated with a velocity of the target. The velocity loss comprises a velocity smoothing loss, and the velocity smoothing loss is calculated from each moment in the each second time window, a velocity state variable of the target at each moment in the respective second time window, and an average velocity state variable of the target in the respective second time window.

In some embodiments, when the target is a vehicle, the state variable includes a velocity of the target vehicle at each moment within the second time window. To ensure velocity smoothing within the second time window, the velocity smoothing penalty shown in Formula (13) may be used to limit the velocity at each moment within the second time window to an average value.

$$w_a \sum_{k=0}^{m-1} \| R_{bw}(v_k - \bar{v}) \|_2^2 \tag{13}$$

$w_a$ is a weight value corresponding to the velocity smoothing loss, $R_{bw}$ is as described above with reference to Formula (6), and $\bar{v}$ is an average velocity in the current second time window.

It may be noted that a velocity smoothing constraint as shown in Formula (13) may be applied for each second time window.

According to some embodiments, the velocity smoothing loss is further calculated from a velocity state variable of the target at each moment in the first time window, and an average velocity state variable of the target in the first time window.

In some embodiments, the state variable includes a velocity of the target vehicle at each moment within the first time window. To ensure velocity smoothing within the first time window, the velocity smoothing penalty shown in Formula (14) may be used to limit the velocity at each moment within the first time window to an average value.

$$w_b \sum_{k=0}^{n-1} \|R_{bw}(v_k - \overline{v})\|_2^2 \tag{14}$$

$w_b$ is a weight value corresponding to the velocity smoothing loss, and $\overline{v}$ is an average velocity in the first time window.

In some embodiments, the weight values $w_a$ and $w_b$ corresponding to the velocity smoothing loss may be determined based on the distance between the target vehicle and the vehicle or roadside equipment in which the plurality of sensors are located. For example, when the distance is greater than a preset threshold, the weight value is positively correlated with the distance; when the distance is not greater than the preset threshold, the weight value is a fixed value.

In some embodiments, the weight value w a and w b corresponding to the velocity smoothing loss may be further determined based on a velocity change rate of the target vehicle calculated from the velocity of the target vehicle at each moment within the sliding time window. Specifically, the weight value when the velocity change rate is greater than the other preset threshold value is smaller than the weight value when the velocity change rate is not greater than the other preset threshold value.

According to some embodiments, the velocity loss further comprises a velocity prior loss calculated from: a velocity state variable at each moment in an overlapped interval of a current first time window and a previous first time window, and an optimized velocity state variable at each moment in the overlapped interval in a state variable optimization process performed for the previous first time window.

In some embodiments, where the first time window is a sliding time window and its sliding step size is less than the length of the first time window, the velocity loss may be determined based on the velocity prior loss. Specifically, in order to retain the previously optimized information for each present moment, the velocity prior loss as shown in Formula (15) may be used to limit the velocity at each moment in the first time window to be close to the last optimized velocity at that moment.

$$w_p \sum_{k=0}^{n-2} \|R_{bw}(v_k - \tilde{v}_k)\|_2^2 \tag{15}$$

Wherein, $\tilde{v}_k$ is the velocity after the last optimization at the present moment, and the value of k at this moment is from 0 to n−2, which represents that the sliding step length of the first time window at this moment is 1, and for $v_0$, $v_1, \ldots, v_{n-2}$, the optimal solution thereof has been obtained in the last optimization (the previous first time window); $w_p$ is the weight value corresponding to the velocity prior loss.

In some embodiments, the weight value corresponding to the a prior loss of velocity may be determined based on the distance between the target vehicle and the vehicle or roadside equipment in which the plurality of sensors is located. When the distance is greater than a preset threshold, the weight value is positively correlated with the distance; when the distance is not greater than the preset threshold, the weight value is a fixed value.

According to some embodiments, the velocity loss further comprises a velocity residual calculated from a velocity observation of the target at each moment in the first time window and a velocity state variable of the target at each moment in the first time window.

When an observation model may provide velocity observation variable, such as a radar model, the velocity loss may also be added flexibly to the velocity residual loss. Assume that the observation variable of the $(l)^{th}$ observation model is:

$$\{(t_k, p_k^l, v_k^l)\}_{k=0}^{n-1},$$

the velocity loss item $e_{ov}$ in Formula (16) needs to be added to the velocity loss Formula, wherein L represents the number of models that may provide velocity observation.

$$e_{ov} = \sum_{l \in L} \sum_{k=0}^{n-1} \rho\left(\left\|\lambda_k^l R_{bw}\left(v_k - v_k^l\right)\right\|_2^2\right) \tag{16}$$

In some embodiments, for example, the velocity vector observed by the radar model is unreliable, however, a velocity norm may be used. If only the velocity norm is available at this time, the velocity loss item $e_{ov}$ may be as shown in Formula (17).

$$e_{ov} = \Sigma_{l \in \mathcal{L}} \Sigma_{k=0}^{n-1} \rho\left(\left\|\lambda_k^l\left(v_k - v_k^l\right)\right\|_2^2\right) \tag{17}$$

In summary, the complete velocity loss item may be expressed as shown in Formula (18).

$$E_v = w_a \sum_{k=0}^{m-1} \|R_{bw}(v_k - \overline{v})\|_2^2 + w_b \sum_{k=0}^{n-1} \|R_{bw}(v_k - \overline{v})\|_2^2 + w_p \sum_{k=0}^{n-2} \|R_{bw}(v_k - \tilde{v}_k)\|_2^2 + e_{ov} \tag{18}$$

The smoothing constraint item $$w_a \Sigma_{k=0}^{m-1} \|R_{bw}(v_k - \overline{v})\|_2^2$$

determined based on the second time window is a multiple term, i.e., equal to the number of the second time window.

According to some embodiments, the loss function comprises an orientation loss associated with an orientation of the target. The orientation loss includes an orientation smoothing loss calculated from each moment of each second time window, an orientation state variable of the target at each moment in the respective second time window, and an average orientation state variable of the target in the respective second time window.

Like the velocity loss, the orientation loss has a similar smooth loss. In some embodiments, the state variable includes an orientation of the target vehicle at each moment within the second time window. In order to ensure a smooth orientation within the second time window, the orientation at each moment in the second time window may be limited to an average value using an orientation smoothing penalty as shown in Formula (19).

$$w_c \sum_{k=0}^{m-1} \|\sin(o_k - \overline{o})\|_2^2 \tag{19}$$

Wherein $w_c$ is a weight value corresponding to the orientation smoothing loss, and $\overline{o}$ is an average orientation within the current second time window.

It may be noted that the velocity smoothing constraint as shown in Formula (19) may be applied to any one of the second time windows.

According to some embodiments, the orientation smoothing loss is further calculated from an orientation state variable of the target at each moment in the first time window and an average orientation state variable of the target in the first time window.

In some embodiments, the state variable includes an orientation of the target vehicle at each moment within the first time window. In order to ensure that the orientation within the first time window is smooth, the orientation at each moment in the first time window may be limited to an average value using an orientation smoothing penalty as shown in Formula (20).

$$w_d \sum_{k=0}^{n-1} \|\sin(o_k - \overline{o})\|_2^2 \tag{20}$$

Wherein $w_d$ is a weight value corresponding to the orientation smoothing loss, and $\overline{o}$ is an average orientation in the first time window.

According to some embodiments, the orientation loss further comprises an orientation prior loss calculated from: an orientation state variable at each moment in an overlapped interval of a first time window and a previous first time window, and an optimized orientation state variable at each moment in the overlapped interval in a state variable optimization process performed for the previous first time window.

In some embodiments, where the first time window is a sliding time window and its sliding step size is less than the length of the first time window, the orientation loss may be determined based on the orientation prior loss. In particular, in order to retain the previously optimized information for each present moment, the orientation for each moment within the first time window may be restricted to be close to the orientation that was last optimized for that moment using the orientation prior loss item shown in Formula (21).

$$w_p \sum_{k=0}^{n-2} \|\sin(o_k - \tilde{o}_k)\|_2^2 \tag{21}$$

Wherein $w_p$ is a weight value corresponding to the orientation prior loss, and $\tilde{o}_k$ is the orientation after the last optimization at the current moment (in this case, it is assumed that the sliding step length of the first time window is 1).

In some embodiments, the state variable includes an orientation of the target at each moment within the first time window. At this time, the orientation loss may include being based on an orientation residual calculated from an orientation state variable of the target at each moment in the first time window and an orientation observation value of the target at each moment in the first time window.

Specifically, the orientation observation variable may directly form a constraint on orientation, and therefore the orientation loss item may be as shown in Formula (22).

$$\sum_{l \in L} \sum_{k=0}^{n-1} \rho\left(\left\|\lambda_k^l \sin\left(o_k - o_k^l\right)\right\|_2^2\right) \tag{22}$$

Wherein $\mathcal{L}$ is a set of different observation sources and $$\lambda_k^l$$

is the weight corresponding to the $(l)^{th}$ observation source, which can be calculated as shown in the following formula (32) with reference to the loss of position.

In some embodiments, the orientation observed value may be a vehicle body orientation, a lane line orientation, or a velocity direction of the target vehicle observed by the at least one observation model. In some embodiments, in order to optimize orientation, when no reliable orientation observation is given, the vehicle should follow the lane, then the lane line orientation of the lane at that time may be considered as an orientation observed value with a fixed variance; furthermore, the velocity direction may also be regarded as an orientation observation, and the higher the velocity, the smaller the difference between the velocity direction and the vehicle orientation.

In some examples, for velocity-based orientation observations, the weight $\lambda_k$ may be calculated from Formula (23).

$$\lambda_k = w_v \frac{v_k}{a} \tag{23}$$

Wherein $w_v$ and a are hyperparameters.

According to some embodiments, the loss function includes a orientation loss associated with the orientation of the target; the orientation loss comprises an orientation smoothing loss calculated from each moment of the each second time window, an orientation state variable of the target at each moment in a respective second time window, and an average orientation state variable of the target in the respective second time window. The orientation loss further comprises an orientation residual comprising a first component orientation residual and/or a second component orientation residual; the first component orientation residual is calculated from an orientation state variable of the first component at each moment in the first time window and an orientation observation variable of the first component at each moment in the first time window; and the orientation residual of the second component is calculated from the orientation state variable of the second component at each moment in the first time window and the orientation observation variable of the second component at each moment in the first time window.

In some embodiments, the target vehicle is a vehicle, such as a truck, that includes a first component and a second component, as shown in FIG. 3. The first and second components may form a structural constraint therebetween by means of a pivot structure (hinge). The state variable includes an orientation of the first component at each moment in the sliding time window and an orientation of the second component at each moment in the sliding time window.

Thus, in some embodiments, the orientation loss may be based on a first component orientation residual and a second component orientation residual, wherein the first component orientation residual is calculated from an orientation of the first component at each moment within the sliding time window and an orientation observed value of the first component at each moment within the sliding time window, and the second component orientation residual is calculated from an orientation of the second component at each moment within the sliding time window and an orientation observed value of the second component at each moment within the sliding time window. The first component orientation residual and the first component orientation residual may be referred to above and will not be described in detail herein.

In some embodiments, the orientation observed value of the first component is an orientation of the first component, a lane line orientation, or a velocity direction of the first component observed by the at least one observation model, and the orientation observed value of the second component is an orientation of the second component, a lane line orientation, or a velocity direction of the second component observed by the at least one observation model.

In some embodiments, when the target vehicle is a vehicle including a first component and a second component, the state variable includes an average orientation of the first component within the sliding time window. Thus, the orientation loss may comprise an orientation smoothing loss of the first component, the orientation smoothing loss of the first component is calculated based on the first component at each moment in each second time window, an orientation state variable of the first component at each moment in the respective second time window, and an average orientation state variable of the first component in the respective second time window.

In some embodiments, when the target vehicle is a vehicle including a first component and a second component, the state variable includes an average orientation of the first component within the sliding time window. Therefore, the directional smoothing loss of the first component can also be calculated from the directional state variable of the first component at each moment in the first time window and the average directional state variable of the first component in the first time window.

It will be appreciated that the orientation loss may also include a smooth orientation loss of the second component, which will not be described in detail herein.

In some embodiments, the sliding step size of the first time window is smaller than the length of the first time window. Thus, when the target vehicle is a vehicle comprising a first component and a second component, the orientation loss may comprise an orientation prior loss of the first component calculated from: an orientation of the first component at each moment in an overlapped region of the first time window and a previous first time window, and an optimized orientation of the first component at each moment in the overlapped region in a state variable optimization process performed for the previous first time window.

According to some embodiments, the loss function includes a orientation loss associated with the orientation of the target; the orientation loss comprises an orientation smoothing loss calculated from each moment of the each second time window, an orientation state variable of the target at each moment in a respective second time window, and an average orientation state variable of the target in the respective second time window. The orientation loss further comprises an angular velocity constraint calculated from: a velocity state variable of the truck at each moment within the first time window, a length of the second member within the first time window, a length of a hinge between the first member and the second member within the first time window, an orientation state variable of the first member at each moment within the first time window, and an orientation state variable of the second member at each moment within the first time window.

Specifically, there is also a motion constraint shown in Formula (11) for the second component's orientation observation. The angular velocity loss may then be as shown in Formula (24).

$$w_{v_k}\sum_{0}^{n-2}\left\|\frac{v_k}{L_t+L_h}\sin(0_k-\beta_k)-\left(\frac{\beta_{k+1}-\beta_k}{\Delta t_k}\right)\right\|_2^2 \tag{24}$$

Wherein $L_t$ and $L_h$ are the lengths of the first component and the pivot structure, respectively, in a manner which will be described below with reference to the size loss.

In summary, the complete orientation loss item can be expressed, for example, as shown in Formula (25).

$$\begin{aligned}E_o = {} & w_o\sum_{k=0}^{m-1}\|\sin(o_k-\overline{o}\|_2^2+w_d\sum_{k=0}^{n-1}\|\sin(o_k-\overline{o}\|_2^2+w_p\sum_{k=0}^{n-2}\|\sin(o_k-\tilde{o}\|_2^2+ \\ & \sum_{l\in L}\sum_{k=0}^{n-2}\rho\left(\|\lambda\sin(o_k-\overline{o}\|_2^2\right)+\sum_{l\in L}\sum_{k=0}^{n-1}\rho\left(\left\|\mu_k^l\sin\left(\beta_k-\beta_k^l\right\|_2^2\right)+ \\ & w_v\sum_{k=0}^{n-2}\left\|\frac{v_k}{L_t+L_h}\sin(o_k-\beta_k)-\left(\frac{\beta_{k+1}-\beta_k}{\Delta t_k}\right)\right\|_2^2\end{aligned} \tag{25}$$

The smoothing constraint item $$w_c\sum_{k=0}^{m-1}\|\sin(o_k-\overline{o})\|_2^2$$

determined based on the second time window is a multiple term, i.e., equal to the number of the second time window.

According to some embodiments, the loss function further comprises a position loss associated with the position of the target. The position loss comprises at least one reference point residual; reference point residuals include at least one of: center point residuals and contour corner point residuals.

According to some embodiments, the position includes a position of at least one reference point including at least one of: a center point and a contour corner point (for example, four angular points of a vehicle detection frame). The position loss includes at least one reference point residual including at least one of: a center point residual and a contour corner point residual representing a difference in an observation variable and a state variable for the center point, and the contour corner point residual representing a difference in an observation variable and a state variable for the contour corner point.

Specifically, it is assumed that the state variable of the target vehicle is optimized based on observation data obtained by L observation models, and L is a positive integer. If the center point observation variable of the $(l)^{th}$ observation model is $$\{(t_k, c_k^l)\}_{k=0}^{n-1},$$

a center point residual $$e_k^l$$

may be constructed based on the difference between the center point observation variable and the state variable. If the $(l)^{th}$ observation model further provides a contour observation, the contour observation variable is $$\{(t_k, z_k^l)\}_{k=0}^{n-1},$$

the contour corner point residual $$u_k^l$$

may be constructed based on the difference between the observation variable and the contour corner point state variable.

In some embodiments, the center point state variable may be characterized based on velocity to achieve further optimization of the velocity state variable by center point residuals. Specifically, when the observation variable includes the center point coordinate of the target vehicle at each moment within the sliding time window, and the state variable includes the velocity of the target vehicle at each moment within the sliding time window, the center point residual may be calculated from the center point coordinate of the target vehicle at each moment within the sliding time window and the velocity of the target vehicle at each moment within the sliding time window.

Specifically, it is assumed that the state variable of the target vehicle is optimized based on observation data obtained by L observation models, and L is a positive integer. If the center point observation variable of the $(l)^{th}$ observation model is $$\{(t_k, c_k^l)\}_{k=0}^{n-1},$$

it is determined that the first frame position coordinate corresponding to the target vehicle is $p_0$, and $$e_k^l \in R^2$$

represents the center point residual vector of the $(l)^{th}$ observation model at moment $t_k$, as shown in Formula (26):

$$e_k^l = p_k - c_k^l \text{ wherein} \tag{26}$$

$$p_k = \left(p_o + \sum_{i=0}^{k-1} v_i \Delta t_i\right) \tag{27}$$

$$v_i = [v_i \cos(\theta), v_i \sin(\theta_i)]^T \tag{28}$$

In some embodiments, the contour corner point state variable may be characterized based on the center point state variable to achieve further optimization of the center point state variable by the contour corner point residual. Specifically, when the observation variable includes contour corner point coordinates of the target vehicle at each moment in the sliding time window, the reference point residual may be calculated from: a center point coordinate of the target vehicle at an initial moment in the sliding time window, a velocity of the target vehicle at each moment in the sliding time window, a contour corner point coordinate of the target vehicle at each moment in the sliding time window, and a corresponding vector from the center point coordinate to the contour corner point coordinate of the target vehicle at each moment in the sliding time window.

Specifically, if the $(l)^{th}$ observation model also provides a contour observation, the contour observation is $$\{(t_k, z_k^l)\}_{k=0}^{n-1},$$

the contour corner point residual may be obtained, as shown in Formula (29).

$$u_k^l = p_k + \phi_m - z_k^l \tag{29}$$

$$\phi_m = \begin{bmatrix} \cos o_i & -\sin o_i \\ \sin o_i & \cos o_i \end{bmatrix} \begin{bmatrix} \delta_m L \\ \eta_m W \end{bmatrix} \tag{30}$$

wherein

Wherein $\phi_m$ represents the vector from the vehicle center point to the vehicle outline angular point.

As described above, in the truck motion model described with reference to FIG. 3, the trailer imposes constraints on the contour observation of the tractor. Thus, in optimizing the respective state variables of the tractor (e.g., the velocity state variables described above), constraints contour observation of the tractor may be further introduced based on the reference point residuals described above.

According to some embodiments, the center point residual and the contour corner point residual respectively have corresponding weights, and the weights are both diagonal matrices; each of the center point residual and the contour corner point residual includes a transverse residual component and a longitudinal residual component having corresponding weights respectively.

In an example according to the present disclosure, when the target is a vehicle, the transverse direction may be a horizontal direction perpendicular to the approximate orientation of the target vehicle; the longitudinal direction may be a horizontal direction parallel to the approximate orientation of the target vehicle. Specifically, the "approximate orientation" may include, for example, the observed vehicle body orientation of the target vehicle, the lane orientation (i.e., lane line orientation) of the lane in which the target vehicle is located, etc.

Thus, according to some embodiments, when the target is a vehicle, the transverse residual component is perpendicular to the lane direction in which the vehicle is located and the longitudinal residual component is parallel to the lane line orientation in which the vehicle is located; or the transverse residual component is perpendicular to the vehicle body orientation of the vehicle, and the longitudinal residual component is parallel to the vehicle body orientation of the vehicle.

In the present disclosure, the transverse direction and the longitudinal direction are focused on when the state variable is estimated, and the transverse direction may be decoupled from the longitudinal direction in order to facilitate model tuning. In some examples, e.g., knowing the vehicle body orientation or lane orientation observed by the radar sensor, the residuals in the ENU coordinate system may thus be rotated through the $R_{bw}$ matrix to the reference coordinate system, and the position loss function including the center point residuals and the contour corner point residuals may be as shown in Formula (31).

$$E_p = \sum_{l=1}^{L}\sum_{k=1}^{n}\left(\rho\left(\left\|\lambda_k^l R_{bw} e_k^l\right\|_2^2\right) + \rho\left(\left\|\mu_k^l R_{bw} u_k^l\right\|_2^2\right)\right) \tag{31}$$

$\rho(\cdot)$ is a robust function;

$$\lambda_k^l, \mu_k^l \in R^{2\times 2}$$

is a weight matrix (a diagonal matrix), and different weights are respectively set for the horizontal residual and the vertical residual; $R_{bw}$ is described above with reference to Formula (6).

In the present disclosure, the robust function $\rho(\cdot)$ may be a robust function based on any suitable loss function, including but not limited to Cauchy (Lorentzian), Charbonnier (pseudo-Huber, L1-L2), Huber, Geman-McClure, smooth truncated quadratic, truncated quadratic, Tukey's biweight, etc. Illustratively, a convex loss function such as Huber may be chosen to preserve the convex optimization problem. However, the convex loss function may have limited robustness to outliers. Thus, in some examples, a non-convex loss function may be selected.

According to some embodiments, when the transverse variance of one of the center point residual and the contour corner residual is less than a predetermined threshold, the weight of the corresponding transverse residual component takes a first fixed value; when the longitudinal variance of one of the center point residual and the contour corner point residual is less than a predetermined threshold, the weight of the corresponding longitudinal residual component takes a first fixed value.

In some examples, taking a center point residual as an example, if at least one of a transverse center point variance component and a longitudinal center point variance component of the center point variance is less than a corresponding first threshold, a corresponding weight of the transverse center point residual component and the longitudinal center point residual component is a first fixed value. In addition, when at least one of the transverse center point variance components and the longitudinal center point variance component is not less than the corresponding first threshold, the weight of the at least one of the transverse center point residual component and the longitudinal center point residual component is negatively correlated with the at least one of the transverse center point variance component and the longitudinal center point variance component.

In some examples, the contour corner point residual may be similar to the center point residual described above, i.e., the weight to which the contour corner point residual corresponds is determined based on the contour corner point variance.

Specifically, the weight matrix is negatively correlated with the variance, and given the transverse variance and the longitudinal variance, the weight matrix may be expressed as shown in Formula (32):

$$\operatorname{diag}\left(w_{long}\min\left(1, \frac{a}{\sigma_{long}}\right), w_{lat}\min\left(1, \frac{b}{\sigma_{lat}}\right)\right) \tag{32}$$

$w_{long}w_{lat}$, a and b are all hyperparameters. Limited by the accuracy of the observation model, small variances do not accurately reflect true errors, so a fixed weight is used when the variance is below the threshold by Formula (32). In the present disclosure, a weighting Formula similar to Formula (32) may be used for all observed loss items.

According to some embodiments, the loss function further comprises a size loss associated with the size of the target. The size loss item comprises at least one of: the size prior loss and the optimized size accumulating loss at each moment. The size prior loss comprises a residual between a size variable of the target at each present moment and a size variable of the target that has been optimized in a state variable optimization process performed for the previous first time window; the size accumulating loss comprises the sum of the size losses of the target from the initial moment to the last optimized moment.

In some embodiments, the sliding step size of the first time window is smaller than the length of the first time window. Thus, the size loss item may include a size prior loss calculated from: a size of a target at each moment in an overlapped region of a first time window and a previous first time window, and an optimized size of a target at each moment in the overlapped region in a state variable optimization process performed for the previous first time window.

According to some embodiments, the size accumulating loss is calculated using an incremental update method; the observation variable of the target at each moment is an observation variable of the target at each moment within the first time window; the state variable of the target at each moment is a state variable of the target at each moment within the first time window; the first time window includes a plurality of data moments, and the moments are at least two of the plurality of data moments.

Specifically, the size accumulating loss includes a sum of the size losses of the target from the initial moment to the last optimized moment. The initial moment is a moment optimization of the state variable is initially started, e.g., an acquired first frame data moment. The last optimization moment may be, for example, the last moment in the previous first time window. Illustratively, the target vehicle contour observation may provide dimensional information of the target vehicle, and therefore, the size accumulating loss may be calculated from: a size loss determined based on a reference point residual for each moment that does not fall within a current first time window and falls within a previous first time window, and a size accumulating loss used in a state variable optimization process performed for the previous first time window.

In some embodiments, the observation variable includes contour corner point coordinates of the target vehicle at each moment within the first time window and center point coordinates of the target vehicle at each moment within the first time window. The state variable includes the velocity of the target vehicle at each moment within the first time window, and the reference point residual corresponding to each moment is calculated from: a center point coordinate observation variable of the target vehicle at the moment, a contour corner point coordinate observation variable of the target vehicle at the moment, and a corresponding vector from the center point coordinate observation variable of the target vehicle at the moment to the contour corner point coordinate observation variable, and the corresponding vector can be determined according to Formula (30).

Specifically, in the optimization framework, the body size or the tractor size of the truck is considered as a global variable to be optimized. When the current state is updated, the oldest frame will be removed and will not be updated again. Although the state variable outside the sliding window is fixed, they may also provide some information about the global size variable. Specifically, when the $(i)^{th}$ frame is eliminated, a new size loss may be generated if contour observation $$z_k^l$$

is available, as shown in Formula (33).

$$\left\|\gamma\mu_k^l R_{bw}\left(\begin{bmatrix}\cos o_i & -\sin o_i\\ \sin o_i & \cos o_i\end{bmatrix}\begin{bmatrix}\delta_m L\\ \eta_m W\end{bmatrix} + p_i - z_i^l\right)\right\|_2^2 = \left\|A_i^l\begin{bmatrix}L\\ W\end{bmatrix} + b_i^l\right)\right\|_2^2 \quad (33)$$

Wherein $$A_i^l \text{ and } b_i^l$$

are a constant and $$\mu_k^l = \mathrm{diag}(\mu_0, \mu_1)$$

is the weight calculated from the variance in Formula (32).

Since the Laplacian distribution may be expressed equivalently as the product of a Gaussian distribution and then inverse Gaussian distribution, in some examples, then $\gamma = \mathrm{diag}(\gamma_0, \gamma_1)$ may be used to approximate the L2 item of the Huber loss function, as shown in Formula (34), for better robustness.

$$\gamma_i = \begin{cases} 1, & r_i \le \delta \\ \sqrt{\dfrac{2\delta}{r_i}}, & r_i > \delta \end{cases} \quad (34)$$

Wherein δ represents a preset parameter, and $r_i$ represents $$R_{bw}\left(\begin{bmatrix}\cos o_i & -\sin o_i\\ \sin o_i & \cos o_i\end{bmatrix}\begin{bmatrix}\delta_m L\\ \eta_m W\end{bmatrix} + p_i - z_i^l\right)$$

in Formula (33).

The number of size loss items may increase over time, and in order to avoid redundant calculations, in embodiments according to the present disclosure, they are combined into one item in an incremental manner so that the loss item at time Ti may be expressed as shown in Formula (35).

$$\left\|A_i\begin{bmatrix}L\\ W\end{bmatrix} + b_i)\right\|_2^2 = \left\|A_{-1}\begin{bmatrix}L\\ W\end{bmatrix} + b_{i-1})\right\|_2^2 + \left\|A_i^l\begin{bmatrix}L\\ W\end{bmatrix} + b_i^l)\right\|_2^2 + C \quad (35)$$

Wherein $A_i$ may be calculated by the SVD decomposition method, as shown in Formulas (36)-(38):

$$A_i^T A_i = A_{i-1}^T A_{i-1} + A_i^{lT} A_i^l = U\Sigma V^T \quad (36)$$

$$= U\Lambda\Lambda^T V^T = U\Lambda V^T (U\Lambda V^T)^T \quad (37)$$

$$A_i = (U\Lambda V^T)^T \quad (38)$$

Wherein $$A_{i-1}^T A_{i-1} + A_i^{lT} A_i^l$$

is a symmetric matrix such that U=V. $b_i$ may be as shown in Formula (39).

$$b_i = A_i^{-T}(A_{i-1}^T A_{i-1} + A_i^{lT} A_i^l) \quad (39)$$

In some embodiments, in an example where the target includes a first component and a second component, such as a truck model as shown in FIG. 3, the trailer and the size of the pivot structure connecting the trailer and the tractor may be calculated from observation variable as shown in Formulas (40)-(42) below.

$$L_t = \frac{1}{n}\sum_{k=0}^{n-1} L_k \quad (40)$$

$$W_t = \frac{1}{n}\sum_{k=0}^{n-1} W_k \quad (41)$$

$$L_h = \frac{1}{n}\sum_{k=0}^{n-1} L_{hk} \quad (42)$$

Here, Formulas (40)-(42) are solutions to the optimization problem, as shown in Formula (43).

$$\min_{L_t, W_t, L_h} \sum_{k=0}^{n-1} (\|L_t - L_k)\|_2^2 + \|W_t - W_k)\|_2^2 + \|L_h - L_{hk})\|_2^2) \quad (43)$$

In summary, knowing the prior loss of L and W, the total size loss item may be as shown in Formula (44).

$$E_s = \left\| A \begin{bmatrix} L \\ W \end{bmatrix} + b) \right\|_2^2 + \lambda \left\| \begin{bmatrix} L \\ W \end{bmatrix} - \begin{bmatrix} \tilde{L} \\ \tilde{W} \end{bmatrix}) \right\|_2^2 \quad (44)$$

The first item in $E_s$ is a size accumulating loss, and the second item is the size prior loss.

In the present disclosure, based on a loss function including at least one of a position loss, an orientation loss, a velocity loss, a size loss, and a structural constraint of a target, the state variable of the target at each moment may be optimized by minimizing the loss function, thereby obtaining optimized state variables. In the field of autonomous driving, the method according to the present disclosure may update the status information of the surrounding vehicles more accurately so that the autonomous driving system makes safe path planning based on the result, thereby avoiding traffic accidents.

Figure 5:
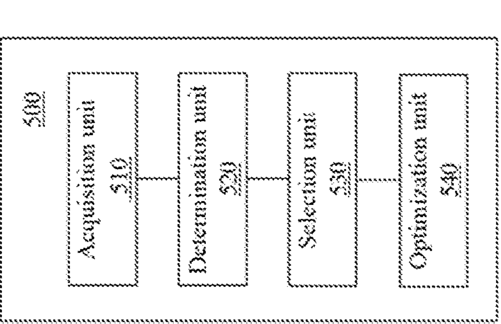
FIG. 5 is a block diagram illustrating a structure of a target state estimating apparatus according to an exemplary embodiment.

According to an embodiment of the present disclosure, as shown in FIG. 5, also provided is an apparatus 500 for target state estimation including: an acquisition unit 510 configured to acquire a data frame sequence corresponding to a plurality of moments; a determination unit 520 configured to determine a first time window based on the data frame sequence, the first time window comprising a first set of state variables to be optimized; a selection unit 530 configured to determine a plurality of second time windows within a first time window, wherein the number of data frames in each second time window is less than the number of data frames in the first time window, there is a repeated data frame in two adjacent second time windows, and there is a second set of state variables to be optimized; an optimization unit 540 configured to simultaneously optimize a second set of state variables in the plurality of second time windows to obtain an optimized first set of state variables.

Figure 6:
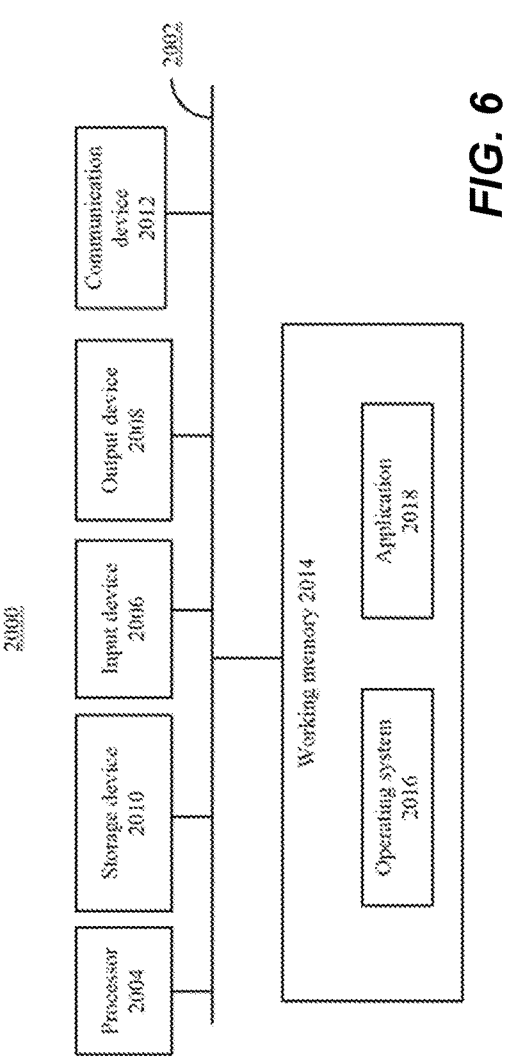
FIG. 6 is a block diagram illustrating an exemplary computing device that may be applied to an exemplary embodiment.

Referring to FIG. 6, a computing device 2000, which is an example of a hardware device that may be applied to aspects of the present disclosure, will now be described. The computing device 2000 may be any machine configured to perform processing and/or computing, and may be, but is not limited to, a workstation, a server, a desktop computer, a laptop computer, a tablet computer, a personal digital assistant, a smart phone, an on-board computer, or any combination thereof. The above-described target state estimating apparatus may be implemented in whole or at least in part by the computing device 2000 or similar device or system.

The computing device 2000 may include elements coupled to or in communication with bus 2002, possibly via one or more interfaces. For example, the computing device 2000 may include a bus 2002, one or more processors 2004, one or more input devices 2006, and one or more output devices 2008. The one or more processors 2004 may be any type of processor and may include, but are not limited to, one or more general-purpose processors and/or one or more special-purpose processors (e.g., special processing chips). Input device 2006 may be any type of device capable of inputting information to computing device 2000 and may include, but is not limited to, a mouse, a keyboard, a touch screen, a microphone, and/or a remote control. The output device 2008 may be any type of device capable of presenting information and may include, but is not limited to, a display, a speaker, a video/audio output terminal, a vibrator, and/or a printer. The computing device 2000 may also include or be connected to a non-transitory storage device 2010, which may be any storage device that is non-transitory and that may enable storage of data, and may include, but is not limited to, a magnetic disk drive, an optical storage device, a solid state memory, a floppy disk, a flexible disk, a hard disk, a magnetic tape, or any other magnetic medium, an optical disk, or any other optical medium, a ROM, a RAM, a cache memory, and/or any other memory chip or cartridge, and/or any other medium from which a computer may read data, instructions and/or code. The non-transitory storage device 2010 may be removable from the interface. The non-transitory storage device 2010 may have data/programs (including instructions)/code for implementing the methods and steps described above. The computing device 2000 may also include a communication device 2012. The communication device 2012 may be any type of device or system that enables communication with external devices and/or with a network, and may include, but is not limited to, a modem, a network card, an infrared communication device, a wireless communication device, and/or a chipset, such as a Bluetooth™ device, a 1302.11 device, a WiFi device, a WiMax device, a cellular communication device, and/or the like.

The computing device 2000 may also include a working memory 2014, which may be any type of working memory that may store programs (including instructions) and/or data useful for the operation of processor 2004, and may include, but is not limited to, random access memory and/or read-only memory devices.

Software elements (programs) may be located in the working memory 2014, including but not limited to an operating system 2016, one or more applications 2018, drivers, and/or other data and code. Instructions for performing the methods and steps described above may be included in one or more applications 2018, and the various elements of the target state estimating apparatus described above etc. may be implemented by the processor 2004 reading and executing instructions of one or more applications 2018. More specifically, the acquisition unit 510 of another afore-mentioned target state estimating apparatus may be implemented, for example, by the processor 2004 executing the application 2018 with instructions to execute step 110. The construction unit 520 of another afore-mentioned target state estimating apparatus may be implemented, for example, by the processor 2004 executing the application 2018 with instructions to execute step 120. Furthermore, the optimization unit 530 of another afore-mentioned target state estimating apparatus may be implemented, for example, by the processor 2004 executing the application 2018 with instructions to execute step 130. Executable code or source code for the instructions of the software elements (programs) may be stored in a non-transitory computer-readable storage medium, such as the storage device 2010 described above, and when executed may be stored in a working memory 2014 (possibly compiled and/or installed). Executable code or source code for the instructions of the software elements (programs) may also be downloaded from a remote location.

It will also be appreciated that various modifications may be made in accordance with specific requirements. For example, custom hardware may also be used, and/or particular elements may be implemented in hardware, software, firmware, middleware, microcode, a hardware description language, or any combination thereof. For example, some or all the disclosed methods and devices may be implemented by programming hardware (e.g., programmable logic circuits including field programmable gate arrays (FPGA) and/or programmable logic arrays (PLA)) in an assembly language or a hardware programming language (such as VERILOG, VHDL, C++) using logic and algorithms according to the present disclosure.

It should also be understood that the foregoing method may be implemented in a server-client mode. For example, a client may receive data input by a user and send the data to a server. The client may also receive data input by the user, perform some of the processing in the afore-mentioned method, and send the data resulting from the processing to the server. The server may receive the data from the client and perform the afore-mentioned method or another part of the afore-mentioned method and return the results of the execution to the client. The client may receive the results of the execution of the method from the server and may, for example, be presented to the user via an output device.

It should also be appreciated that the components of the computing device 2000 may be distributed across a network. For example, some processes may be performed using one processor while other processes may be performed by another processor remote from the one processor. Other components of the computing system 2000 may also be similarly distributed. As such, the computing device 2000 may be interpreted as a distributed computing system that performs processing at multiple locations.

Although embodiments or examples of the present disclosure have been described with reference to the accompanying drawings, it is to be understood that the above-described methods, systems, and devices are merely exemplary embodiments or examples, and that the scope of the present invention is not limited by these embodiments or examples, but is defined only by the appended claims and their equivalents. Various elements of the embodiments or examples may be omitted or replaced with equivalents thereof. Furthermore, steps may be performed in an order other than that described in the present disclosure. Further, various elements of the embodiments or examples may be combined in various ways. Importantly, as technology evolves, many of the elements described herein may be replaced with equivalent elements that emerge from the present disclosure.

What is claimed is:

1. A method for state estimation of a target, comprising:

acquiring a data frame sequence corresponding to a plurality of moments;

determining a first time window based on the data frame sequence, the first time window comprising a first set of state variables to be optimized;

determining a plurality of second time windows within the first time window, wherein the number of data frames corresponding to each second time window is less than the number of data frames corresponding to the first time window, there is at least one same data frame in two adjacent second time windows, and there is a second set of state variables to be optimized in each second time window;

optimizing the second set of state variables in the plurality of second time windows to optimize the first set of state variables; and causing an autonomous vehicle to travel according to a path planned based on the optimized first set of state variables, wherein:

the optimizing the second set of state variables comprises minimizing a loss function;

the loss function comprises a smoothing loss of the second set of state variables, a velocity loss associated with a velocity of the target, or an orientation loss associated with an orientation of the target;

the smoothing loss is calculated from the second set of state variable of the target at each moment in each second time window and an average value of the second set of state variables of the target in each second time window;

the velocity loss comprises a velocity smoothing loss calculated from a velocity state variable of the target at each moment in a respective second time window, and an average velocity state variable of the target in the respective second time window; and the orientation loss comprises an orientation smoothing loss calculated from an orientation state variable of the target at each moment in a respective second time window, and an average orientation state variable of the target in the respective second time window;

the loss function further comprises a position loss associated with a position of the target or a size loss associated with a size of the target;

the position loss comprises at least one reference point residual;

the reference point residual comprises at least one of: a center point residual or a contour corner point residual;

the size loss comprises at least one of: the size prior loss or an optimized size accumulating loss at each moment;

the size prior loss comprises a residual between a size variable of the target at each present moment and a size variable of the target that has been optimized in a state variable optimization process performed for the previous first time window; and the size accumulating loss comprises a sum of the size losses of the target from an initial moment to a last optimized moment.

2. The method according to claim 1, wherein the first set of state variables comprises at least one of:

at least one of a velocity, a position, an orientation, or a size of the target at each moment in the first time window; and at least one of an average velocity, an average position, or an average orientation of the target in the first time window; or the second set of state variables comprises at least one of:

at least one of a velocity, a position, an orientation, or a size of the target at each moment in the second time window; and at least one of an average velocity, an average position, or an average orientation of the target in the second time window.

3. The method according to claim 1, wherein the velocity smoothing loss is further calculated from a velocity state variable of the target at each moment in the first time window, and an average velocity state variable of the target in the first time window.

4. The method according to claim 1, wherein the orientation smoothing loss is further calculated from an orientation state variable of the target at each moment in the first time window and an average orientation state variable of the target in the first time window.

5. The method according to claim 2, wherein the target is a vehicle comprising a first component and at least one second component rotatable about the first component;

the location of the target comprises at least one of: a position of the first component, a position of each of the at least one second component, or a position of the vehicle;

the size of the target comprises at least one of: a size of the first component, a size of each of the at least one second component, or a size of the vehicle; and the orientation of the target comprises at least one of: an orientation of the velocity, an orientation of the first component, or an orientation of a lane in which the vehicle is located.

6. The method according to claim 5, wherein the orientation loss further comprises an orientation residual comprising a first component orientation residual or a second component orientation residual, or an angular velocity constraint; wherein the first component orientation residual is calculated from an orientation state variable of the first component at each moment in the first time window and an orientation observation variable of the first component at each moment in the first time window; and the second component orientation residual is calculated from an orientation state variable of the second component at each moment in the first time window and an orientation observation variable of the second component at each moment in the first time window; and the angular velocity constraint calculated from: a velocity state variable of the vehicle at each moment within the first time window, a length of the second component within the first time window, a length of a hinge between the first component and the second component within the first time window, an orientation state variable of the first component at each moment within the first time window, and an orientation state variable of the second component at each moment within the first time window.

7. An electronic device, comprising:

at least one processor; and a memory communicatively connected to the at least one processor; wherein the memory stores an instruction executable by the at least one processor, and the instruction is executed by the at least one processor to enable the at least one processor to execute a method for state estimation of a target comprising:

acquiring a data frame sequence corresponding to a plurality of moments;

determining a first time window based on the data frame sequence, the first time window comprising a first set of state variables to be optimized;

determining a plurality of second time windows within the first time window, wherein the number of data frames in each second time window is less than the number of data frames in the first time window, there is a repeated data frame in two adjacent second time windows, and there is a second set of state variables to be optimized in each second time window;

optimizing the second set of state variables in the plurality of second time windows to obtain an optimized first set of state variables; and causing an autonomous vehicle to travel according to a path planned based on the optimized first set of state variables, the target is a vehicle comprising a first component and at least one second component rotatable about the first component;

the optimizing the second set of state variables comprises minimizing a loss function;

the loss function comprises an orientation loss associated with the orientation of the target;

the orientation loss comprises an orientation residual comprising a first component orientation residual or a second component orientation residual, or an angular velocity constraint;

the first component orientation residual is calculated from an orientation state variable of the first component at each moment in the first time window and an orientation observation variable of the first component at each moment in the first time window;

the second component orientation residual is calculated from an orientation state variable of the second component at each moment in the first time window and an orientation observation variable of the second component at each moment in the first time window; and the angular velocity constraint calculated from: a velocity state variable of the vehicle at each moment within the first time window, a length of the second component within the first time window, a length of a hinge between the first component and the second component within the first time window, an orientation state variable of the first component at each moment within the first time window, and an orientation state variable of the second component at each moment within the first time window.

8. A non-transitory computer-readable storage medium storing a computer instruction, wherein the computer instruction is used for causing a computer to execute a method for state estimation of a target comprising:

acquiring a data frame sequence corresponding to a plurality of moments;

determining a first time window based on the data frame sequence, the first time window comprising a first set of state variables to be optimized;

determining a plurality of second time windows within the first time window, wherein the number of data frames in each second time window is less than the number of data frames in the first time window, there is a repeated data frame in two adjacent second time windows, and there is a second set of state variables to be optimized in each second time window;

optimizing the second set of state variables in the plurality of second time windows to obtain an optimized first set of state variables; and causing an autonomous vehicle to travel according to a path planned based on the optimized first set of state variables, wherein:

the optimizing the second set of state variables comprises minimizing a loss function;

the loss function comprises a smoothing loss of the second set of state variables, a velocity loss associated with a velocity of the target, or an orientation loss associated with an orientation of the target;

the smoothing loss is calculated from the second set of state variable of the target at each moment in each second time window and an average value of the second set of state variables of the target in each second time window;

the velocity loss comprises a velocity smoothing loss calculated from a velocity state variable of the target at each moment in a respective second time window, and an average velocity state variable of the target in the respective second time window; and the orientation loss comprises an orientation smoothing loss calculated from an orientation state variable of the target at each moment in a respective second time window, and an average orientation state variable of the target in the respective second time window;

the loss function further comprises a position loss associated with a position of the target or a size loss associated with a size of the target;

the position loss comprises at least one reference point residual;

the reference point residual comprises at least one of: a center point residual or a contour corner point residual;

the size loss comprises at least one of: the size prior loss or an optimized size accumulating loss at each moment;

the size prior loss comprises a residual between a size variable of the target at each present moment and a size variable of the target that has been optimized in a state variable optimization process performed for the previous first time window; and the size accumulating loss comprises a sum of the size losses of the target from an initial moment to a last optimized moment.

9. The medium according to claim 8, wherein the first set of state variables comprises at least one of:

at least one of a velocity, a position, an orientation, or a size of the target at each moment in the first time window; or at least one of an average velocity, an average position, or an average orientation of the target in the first time window; and the second set of state variables comprises at least one of:

at least one of a velocity, a position, an orientation, or a size of the target at each moment in the second time window; or at least one of an average velocity, an average position, or an average orientation of the target in the second time window.

10. The medium according to claim 8, wherein the velocity smoothing loss is further calculated from a velocity state variable of the target at each moment in the first time window, and an average velocity state variable of the target in the first time window.

11. The medium according to claim 8, wherein the orientation smoothing loss is further calculated from an orientation state variable of the target at each moment in the first time window and an average orientation state variable of the target in the first time window.

12. The medium according to claim 9, wherein the target is a vehicle comprising a first component and at least one second component rotatable about the first component;

the location of the target comprises at least one of: a position of the first component, a position of each of the at least one second component, or a position of the vehicle;

the size of the target comprises at least one of: a size of the first component, a size of each of the at least one second component, or a size of the vehicle; and the orientation of the target comprises at least one of: an orientation of the velocity, an orientation of the first component, or an orientation of a lane in which the vehicle is located.

13. The medium according to claim 12, wherein the orientation loss further comprises an orientation residual comprising a first component orientation residual or a second component orientation residual, or an angular velocity constraint; wherein the first component orientation residual is calculated from an orientation state variable of the first component at each moment in the first time window and an orientation observation variable of the first component at each moment in the first time window; and the second component orientation residual is calculated from an orientation state variable of the second component at each moment in the first time window and an orientation observation variable of the second component at each moment in the first time window; and the angular velocity constraint calculated from: a velocity state variable of the truck at each moment within the first time window, a length of the second component within the first time window, a length of a hinge between the first component and the second component within the first time window, an orientation state variable of the first component at each moment within the first time window, and an orientation state variable of the second component at each moment within the first time window.

14. The electronic device according to claim 7, wherein the orientation of the target comprises at least one of: an orientation of the velocity, an orientation of the first component, or an orientation of a lane in which the vehicle is located.

15. The electronic device according to claim 7, wherein:

the orientation loss further comprises an orientation smoothing loss calculated from an orientation state variable of the target at each moment in a respective second time window, and an average orientation state variable of the target in the respective second time window; and the orientation loss further comprises an orientation prior loss calculated from: an orientation state variable at each moment in an overlapped interval between the first time window and a previous first time window, and an optimized orientation state variable at each moment in the overlapped interval in a state variable optimization process performed for the previous first time window.

16. The method according to claim 1, wherein:

the velocity loss further comprises a velocity prior loss calculated from: a velocity state variable at each moment in an overlapped interval between a current first time window and a previous first time window, and an optimized velocity state variable at each moment in the overlapped interval in a state variable optimization process performed for the previous first time window;

the velocity loss further comprises a velocity residual calculated from a velocity observation variable of the target at each moment in the first time window and a velocity state variable of the target at each moment in the first time window.

17. The method according to claim 1, wherein:

the orientation loss further comprises an orientation prior loss calculated from: an orientation state variable at each moment in an overlapped interval between the first time window and a previous first time window, and an optimized orientation state variable at each moment in the overlapped interval in a state variable optimization process performed for the previous first time window.

* * * * *